UNITED STATES PATENT OFFICE.

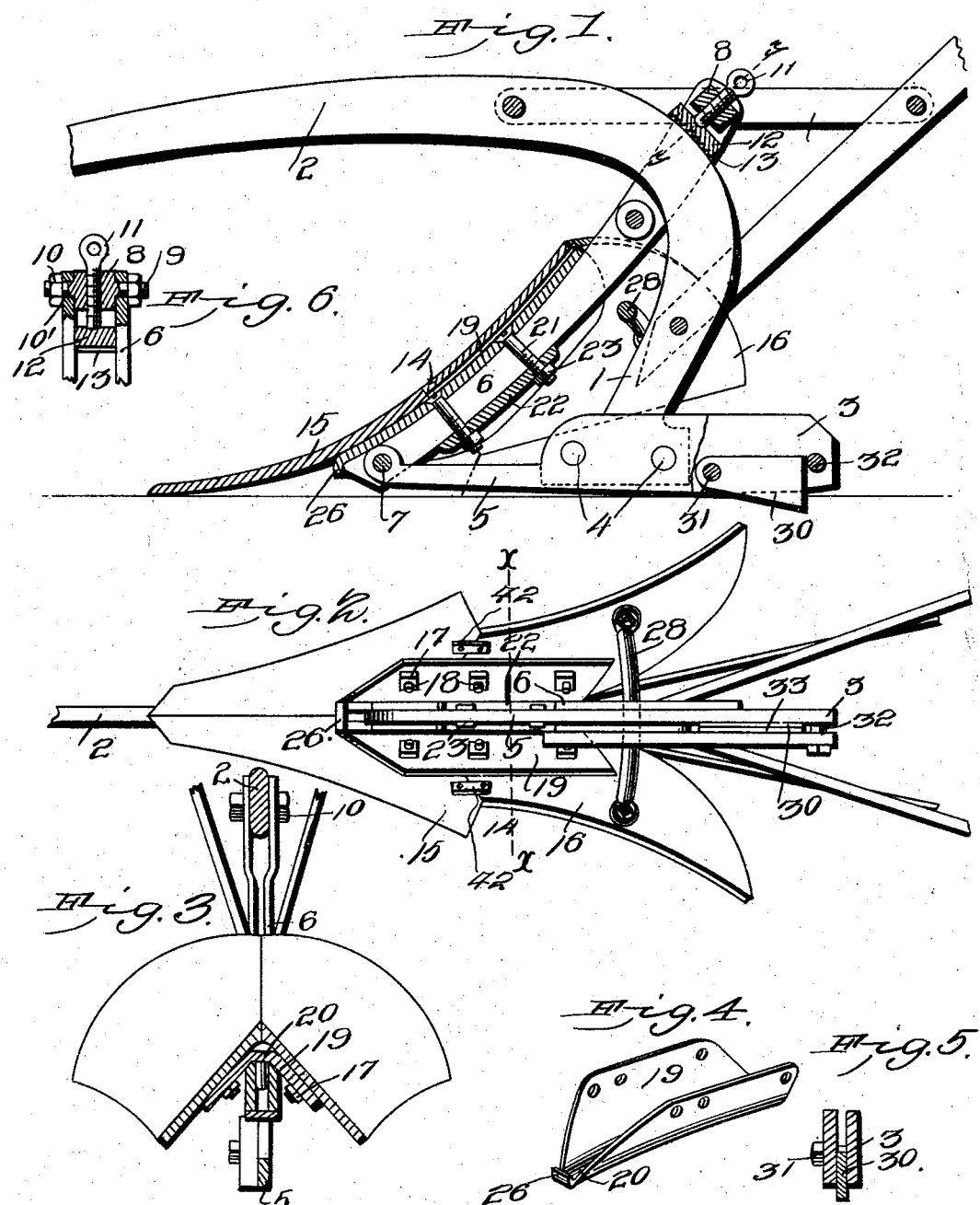

ELIAS HANKINS, OF PURDON, TEXAS.

PLOW.

SPECIFICATION forming part of Letters Patent No. 709,901, dated September 30, 1902.

Application filed May 28, 1902. Serial No. 109,378. (No model.)

*To all whom it may concern:*

Be it known that I, ELIAS HANKINS, a citizen of the United States, residing at Purdon, in the county of Navarro and State of Texas, have invented a new and useful Plow, of which the following is a specification.

This invention relates to plows; and it has for its object to provide an improved construction and arrangement of parts whereby an implement shall be produced which shall possess great advantages in point of simplicity, durability, and general efficiency.

The invention relates particularly to that class of plows in which a landside is permanently attached to the depending portion of the beam and having pivotal connection at its front end with the lower end of the standard or stock carrying the plow-blade.

My invention consists especially in certain improvements in the detailed construction of the plow-frame and of a breaking-plow which is connected with said frame in such a manner as to be detachable in order to permit the plow to be used as an ordinary single-stock plow.

In the accompanying drawings, Figure 1 is a side elevation, partly in section, of a plow constructed in accordance with my invention. Fig. 2 is a bottom plan view of the same. Fig. 3 is a transverse sectional detail view taken on the line $x$ $x$ in Fig. 2 and looking in a rearward direction. Fig. 4 is a detail view showing perspectively the under side of the V-shaped support which forms a part of the breaking-plow and whereby it is connected with the standard. Fig. 5 is a sectional view taken through the heel of the landside and showing the knife or cutter arranged therein. Fig. 6 is a sectional detail view taken on the line $y$ $y$ in Fig. 1.

Corresponding parts in all the figures are designated by like characters of reference.

To the lower end of the depending portion 1 of the plow-beam 2, which is enlarged, as shown in dotted lines in Fig. 1, to receive the connecting-bolts, is secured the landside 3, which is composed of two separate plates, receiving between them the enlarged lower portion of the plow-beam, to which they are connected by means of bolts or similar fastenings 4. One of the plates composing the landside is extended in front of the other one, as shown at 5, and is connected pivotally at its front end with the sides of the bifurcated stock or standard 6 by means of a connecting-bolt 7. The sides 6 of the bifurcated stock or standard are connected at their upper ends by means of a nut 8, interposed between the said side pieces and having laterally-extending screw-threaded projections 9 extending through perforations in the side pieces 6, and having nuts 10 upon their outer ends, whereby the parts are clamped together in such a manner as to permit the nut 8 to turn upon the axis provided therefor by the extensions or swivels 9. An eyebolt 11, passing through the nut 8, presses at its lower end against a slide 12, the under side of which is provided with teeth 13, bearing upon the curved portion of the plow-beam. It will be observed that by this arrangement the stock or standard may be adjusted at any desired angle with relation to the landside of the plow.

14 designates a double breaking-plow, of which 15 is the point and 16 the moldboard. The said point and moldboard are secured, by means of nuts and bolts 17 and 18, to the upper side of a V-shaped connecting-plate 19, the edge of which is flattened, as shown at 20, so as to leave a space between the said flattened edge and the adjacent under sides of the plow-point and moldboard sufficient to accommodate the heads of the bolts 21, by means of which the said V-shaped plate carrying the plow is connected with the bifurcated stock or standard, the said bolts passing through a plate 22 upon the under side of said stock or standard and being provided with nuts 23, bearing against said plate. The V-shaped plate is provided at its lower end with a downturned nose 26, bearing against the point of the stock or standard and serving to make it impossible for the plow to be displaced upwardly upon said stock or standard in the event of obstructions being encountered thereby. Braces or plates 42 connect the abutting edges of the point 15 and moldboard 16 on their under sides adjacent to the plate 19, so as to absolutely prevent displacement of said abutting edges.

The sides or wings of the double moldboard are connected by means of a transverse brace 28, extending below the stock or standard and secured detachably to the said wings by means of nuts or bolts, this brace serving to impart additional strength and rigidity to the parts.

Between the sides of the landside, at the rear end of the same, is arranged a knife or cutter 30, mounted pivotally upon a bolt 31 at its front end. A bolt 32, which connects the sides of the landside in rear of the said cover, serves to hold the same in position securely at any desired point of adjustment by clamping the said sides together. One of the side pieces of the landside is provided on its inner side with a washer-plate 33, adapted to bear against the knife or cutter to make the adjustment of the same secure.

It will be observed that the sides 3 3, composing the landside, are secured on opposite sides of the enlarged lower end of the beam, which said enlarged portion extends practically to the lower edges of the side pieces 3. This is on the same level as the lower edge of the forwardly-projecting portion of one of said side pieces, which has pivotal connection with the lower end of the adjustable standard. Directly in rear of the enlarged lower portion of the depending end of the beam is pivoted the blade 30, and the space not occupied by said blade is filled in by the washer-plate 33, which, as already described, is preferably connected or made integral with the adjacent side piece 3. It follows that the entire under side of the landside and its related parts are practically smooth and unbroken, with the exception of the depending portion of the blade 30, which serves as a guide. The under side of the landside thus forms a heel-gage or depth-runner, which, being adjustable with relation to the standard carrying the plow, will regulate the depth of the cut of the latter and will at the same time, owing to its peculiar construction, not be liable to clog, so as to interfere with the progress of the plow.

The operation of my invention will be readily understood from the foregoing description, taken in connection with the drawings hereto annexed. The plow-frame, as will be seen, is practically that of a single-stock plow, and it may be used as such by simply detaching the breaking-plow, which may be done by removing the nuts of the bolts whereby the V-shaped plate carrying said plow is secured in position upon the standard and disconnecting one end of the brace 28 and loosening the other end of said brace. The breaking-plow may then be readily lifted off the stock or standard and a blade of any desired construction adjusted thereupon. The single plow-frame may thus be used at all seasons by simply changing the plow-blades. The construction and arrangement of the parts constituting my invention are simple and effective. The breaking-plow constructed and arranged as herein described is capable of being held with a great degree of security, owing to the arrangement of the peculiarly-constructed V-shaped plate and its connections. The adjustment of the stock or standard relatively to the landside is simple and easily effected, and the parts constituting the device are simple and combine to coöperate with a great degree of efficiency.

Having thus described my invention, I claim and desire to secure by Letters Patent of the United States—

1. In a plow, the combination of the beam, the landside secured at the lower end of the depending part of the same and having a forwardly-extended portion, the bifurcated stock or standard connected pivotally with the front end of the landside, a nut interposed between the upper ends of the side pieces constituting said stock and having laterally-extending pins extending through and connected with the sides of said stock, an eyebolt mounted in said nut, and a toothed slide pressed by said bolt against the curved portion of the beam, substantially as set forth.

2. In a plow, the combination of the beam, the landside connected with the lower end of said beam and having a forwardly-extended portion, the bifurcated stock having pivotal connection with the front end of the landside, a swiveled nut interposed between the sides of the said bifurcated stock at the upper end of the same, a bolt in said swiveled nut, and a toothed plate adapted to be pressed by said bolt against the curved portion of the beam, substantially as set forth.

3. In a plow, the combination with the bifurcated stock having pivotal connection with the landside and means for securing it in position, of the V-shaped plate mounted upon said bifurcated stock and having at its lower end a downturned nose bearing against the point of said stock, and the point and moldboard constituting a breaking-plow mounted securely upon said V-shaped plate, substantially as set forth.

4. In a plow, the combination with the bifurcated stock having pivotal connection with the landside and means for securing it in position, of a V-shaped plate having its edge flattened to receive bolts whereby it is connected with the bifurcated standard, said V-shaped plate being provided at its lower edge with a downturned point engaging against the point of the bifurcated stock, the point and moldboard constituting a double breaking-plow mounted securely upon said V-shaped plate, and a brace having its end detachably connected with the under sides of the rims of the moldboard, substantially as set forth.

5. In a plow, the combination with the beam, of the landside composed of two separate parts mounted on opposite sides of the enlarged lower end of the depending portion of the beam, one of said parts being provided with an enlargement forming a seat or washer on its inner side, a knife or cutter mounted pivotally between the parts constituting the landside adjacent to the seat or washer, a bolt connecting the sides of said landside in rear of said knife which may thus be clamped and held at any desired adjustment, and an extension of one of the parts of the landside having pivotal connection with the lower end of the plow-standard, substantially as set forth.

6. In a plow, the combination with the bifurcated stock having pivotal connection with the landside and means for securing it in position, of a V-shaped plate having its edge flattened to receive bolts whereby it is connected with the bifurcated standard, said V-shaped plate being provided at its lower edge with a downturned point engaging against the point of the bifurcated stock, the point and moldboard constituting a double breaking-plow mounted securely upon said V-shaped plate, plates connecting the abutting edges of said point and moldboard, on the under sides thereof, adjacent to the V-shaped plate, and a brace having its ends detachably connected with the under sides of the wings of the moldboard, substantially as set forth.

In testimony that I claim the foregoing as my own I have hereto affixed my signature in the presence of two witnesses.

ELIAS HANKINS.

Witnesses:
W. T. SMITH,
JOHN B. GUTHRIE.